US006814662B2

(12) United States Patent
Sasaki et al.

(10) Patent No.: US 6,814,662 B2
(45) Date of Patent: *Nov. 9, 2004

(54) PORTABLE ELECTRONIC DEVICE, ENTERTAINMENT SYSTEM AND METHOD OF OPERATING THE SAME

(75) Inventors: Nobuo Sasaki, Tokyo (JP); Akio Ohba, Tokyo (JP)

(73) Assignee: Sony Computer Entertainment, Inc., Tokyo (JP)

( * ) Notice: Subject to any disclaimer, the term of this patent is extended or adjusted under 35 U.S.C. 154(b) by 618 days.

This patent is subject to a terminal disclaimer.

(21) Appl. No.: 09/854,639

(22) Filed: May 14, 2001

(65) Prior Publication Data

US 2001/0036851 A1 Nov. 1, 2001

Related U.S. Application Data

(63) Continuation of application No. 09/322,774, filed on May 28, 1999, now Pat. No. 6,254,477.

(30) Foreign Application Priority Data

Jun. 1, 1998 (JP) .......................................... P10-151527

(51) Int. Cl.$^7$ ................................................ A63F 13/00
(52) U.S. Cl. ................................ 463/1; 463/7; 463/29; 463/47
(58) Field of Search ....................... 463/1, 7, 8, 34–37, 463/42–47, 40, 9

(56) References Cited

U.S. PATENT DOCUMENTS

| 4,858,930 A | 8/1989 | Sato |
| 5,457,643 A | 10/1995 | Vahey et al. |
| 5,491,777 A | 2/1996 | Mase et al. |
| 5,766,077 A | 6/1998 | Hongo |
| 5,885,156 A | 3/1999 | Toyohara et al. |
| 5,971,855 A | 10/1999 | Ng |
| 6,165,068 A | 12/2000 | Sonoda et al. |

FOREIGN PATENT DOCUMENTS

| JP | 08-332282 | 12/1996 |
| TW | 311199 | 7/1997 |

OTHER PUBLICATIONS

Sony Computer Entertainment America Expands the World of its Playstation Game Console Through Introduction of Personal Digital Assistant (PDA) XP–002114046, Wednesday May 27, 1998.
Weekly Famitsu No. 482, p. 8, issued on Mar. 13, 1998.
Mac Fan Internet, Aug., pp. 64–67, issued on Jul. 11, 1997.

*Primary Examiner*—John M. Hotaling, II
(74) *Attorney, Agent, or Firm*—Katten Muchin Zavis Rosenman

(57) ABSTRACT

A portable electronic device and an entertainment system that can give a user a sense of familiarity by generating a proper character using an identification number and by displaying it, for example, on a display means include an identification-number holding section which holds a proper identification number through a bus, which is connected to an interface to connect to a game-machine main body having a program-execution function. Input operation is performed by a player at an input-operation section. At an operation-information generation section, an operation information is generated in response to the input operation at the input-operation section. The RAM provides for use for operation information stores the operation information received from the operation-information generation section. A character-information generation section generates proper character information in accordance with the operation information and gene information when the latter is received through the game-machine main body. The gene information determines the character-transmission factor of the character corresponding to the proper identification number.

32 Claims, 17 Drawing Sheets

15 CONVERSION TABLE

| IDENTIFICATION NUMBER | GENE INFORMATION |
|---|---|
| 000001 | ABCDEFGHIJ... |
| 000002 | CBCSSSGHII... |
| 000003 | XAKDEPPPIJ... |
| ...... | ...... |

PORTABLE ELECTRONIC DEVICE, ENTERTAINMENT SYSTEM AND METHOD OF OPERATING THE SAME

This application is a continuation of Ser. No. 09/322,774, filed May 28, 1999 now U.S. Pat. No. 6,254,477.

BACKGROUND OF THE INVENTION

1. Field of the Invention

The present invention relates to an entertainment system which includes portable electronic devices, such as portable game terminals and memory cards and a host machine which is connected to said portable electronic devices.

2. Description of the Prior Art

Portable electronic devices or subordinate machines such as traditional memory cards that are used, inserted into a master information system such as a video-game machine, are composed of an interface to connect to the main body (host machine) of the information apparatus and nonvolatile storage cells to store data.

Recently, considerations have been made to equip subordinate machines that are connected to a host machine, such as a video-game machine, using memory-card slots, with a function to execute a program such as a game. Since such subordinate machines can be used as portable game terminals as such, their applied field is expanded, and they lead to a rise in new demands.

Conventional portable electronic devices such as the above-noted portable game terminals are given special or proper identification numbers including identification characters and symbols. Although these are convenient for manufacturers to distinguish them from others, they do not have much use for users. Even if they can be used to distinguish them from other electronic devices one has at hand, it is not very interesting.

SUMMARY OF THE INVENTION

It is an object of the present invention to avoid the above-noted actual situation. It is another object of the present invention to provide a portable electronic device and an entertainment system that generate proper characters using identification numbers, and giving users a sense of familiarity, for example, by displaying them in the display means.

These and other objects of the present invention are obtained by a portable electronic device having an interface to connect to a host machine with a program-execution function, comprising an identification-number holding means for holding proper identification numbers, an input-operation means to execute an input operation, an operation-information generation means for generating operation information in accordance with the input operation from said input-operation means, an operation-information storage means for storing the operation information from said operation-information generation means, and a character-information generation means for generating proper character information in accordance with said operation information and gene information, upon receiving, via said host machine, gene information that determines the character-transmission factor of the character corresponding to said proper identification number.

In order to solve the above-noted problem, of the conventional entertainment systems an entertainment system of this invention comprises a host machine having a program-execution function and subordinate machines equipped with an interface to connect to this host machine, wherein said host machine transfer information which accompanies the execution of a program to said subordinate machines, and said subordinate machines include an identification-number holding means for holding proper identification numbers, an input-operation means for executing an input operation, an operation-information generation means for generating operation information in accordance with the input operation from said input-operation means, an operation-information storage means for storing the operation information from said operation-information generation means, and a character-information generation means for generating proper character information in accordance with said operation information and gene information on receiving, via said host machine, gene information that determines the character-transmission factor of the character corresponding to said proper identification number.

In this entertainment system, the host machine reads out, as the program is being executed, gene information corresponding to the proper identification number from the recording medium and transfers it to the subordinate machine. Also, the subordinate machine may be equipped with time-information generation means to continuously generate time information, and the character-information generation means generates proper character information in accordance with the time information, said gene information, and the operation information.

In the entertainment system, a plurality of said subordinate machines can be provided. In such a case, the multiple subordinate machines generate proper character information and display multiple character images in their display means that are connected to the host machine based on the respective proper character information.

Furthermore, in the entertainment system, the two specified subordinate machines connected to the host machine generate character information related to an imaginary subordinate machine in accordance with respective gene information and operation information upon receiving, via the home machine, gene information corresponding to the proper identification number. And the two specified subordinate machines are equipped with a character-information storage means to store the character information and store, using at least one of the character storage means, the character information related to the imaginary subordinate machine.

DETAILED DESCRIPTION OF THE PREFERRED EMBODIMENTS

Figure 1:
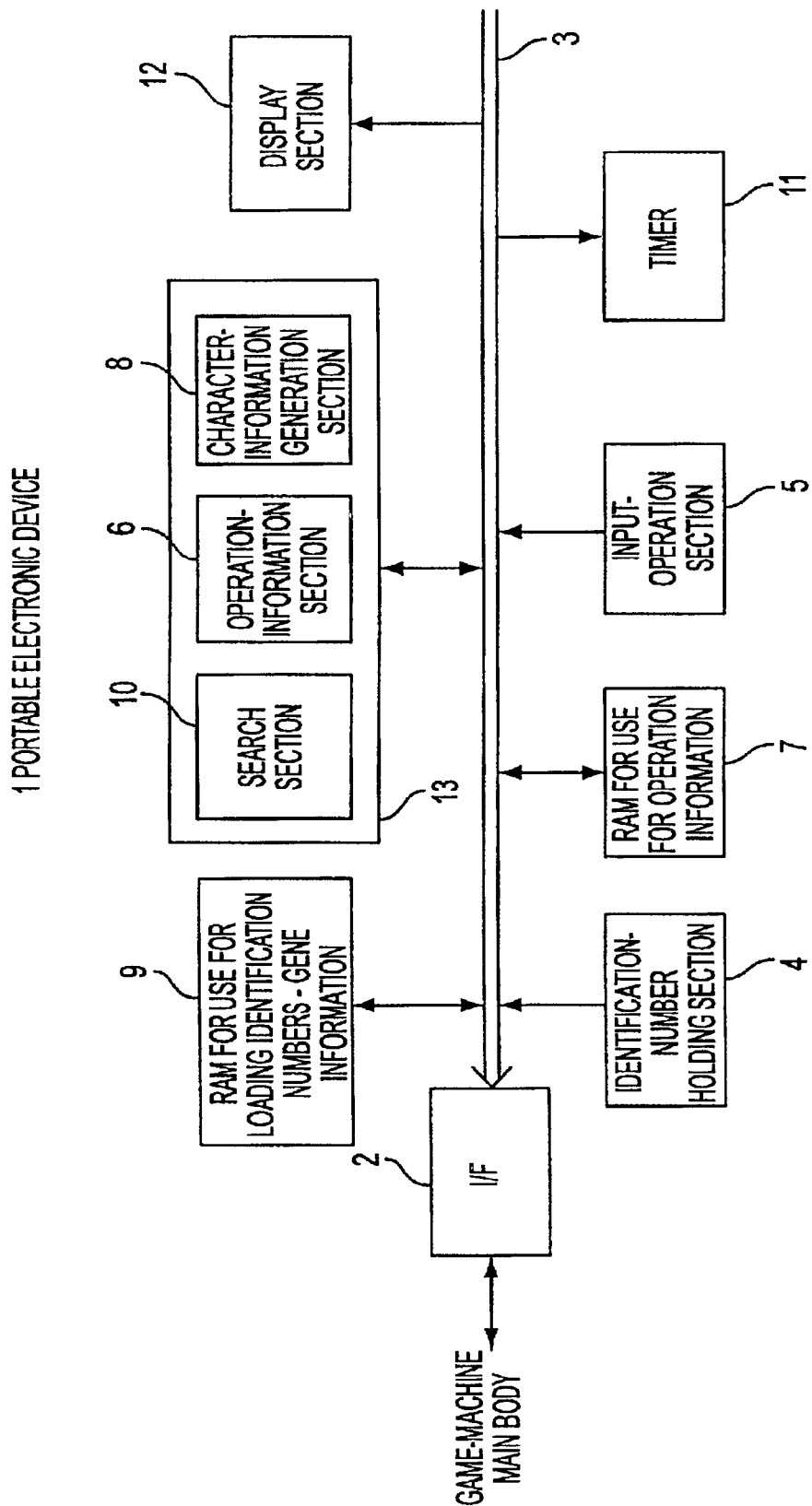
FIG. 1 is a block diagram showing the configuration of the portable electronic device of the present invention via a BUS.

Referring to the drawings, below will be given an explanation as to in what form the portable electronic device of the present invention is realized. It is realized in the form of a portable electronic device that can be connected to the main body of a game machine, which becomes the host machine or a portable electronic device that can be used as a single body as a portable small-size game terminal.

Figure 2:
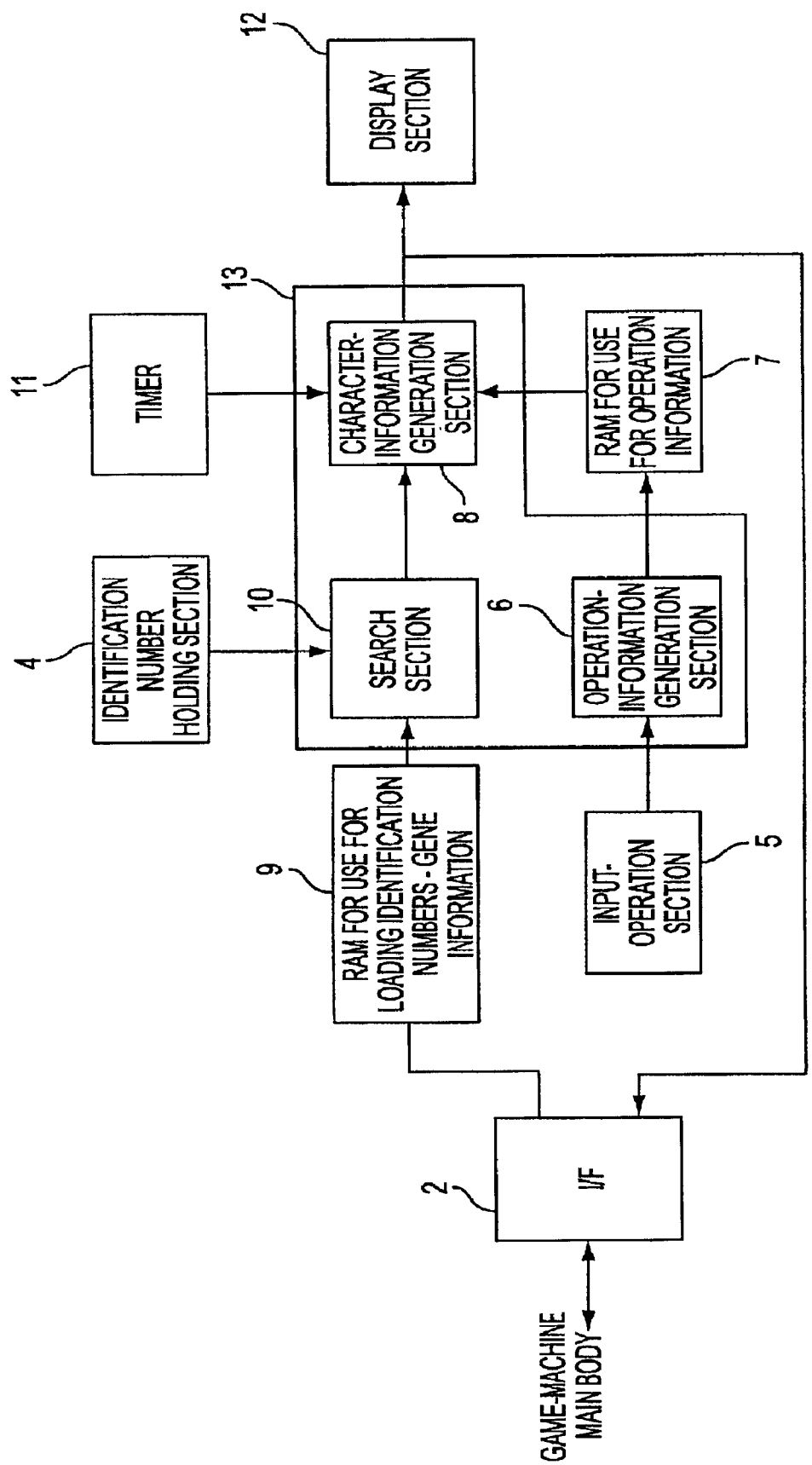
FIG. 2 is a function block diagram of the portable electronic device of FIG. 1.

FIG. 1 and FIG. 2 show the configuration of a portable electronic device 1 in the form in which it is realized. FIG. 1 is an electric block diagram showing the configuration via BUS 3 within the portable electronic device 1. FIG. 2 is a function bloc diagram showing as to how each functional part of the portable electronic device is connected.

This portable electronic device 1 is equipped with interface (I/F) 2 to connect it to the main body of the game machine having a program-execution function, an identification-number holding section 4 that holds the proper identification numbers via BUS 3, which is connected to this I/F 2, input-operation section 5 in which input operation by the player takes place, operation-information generation section 6 to generate operation information in response to the input operation at this input-operation section 5, RAM 7 for use for operation information, which stores operation information from this operation-information generation section 6, character-information generation section 8, which generates proper character information in accordance with said operation information and gene information on receiving, via said main body of the game machine, gene information corresponding to the proper identification number. Furthermore, this gene information determines the character-transmission factor of the character.

Also, the portable electronic device 1 is provided with RAM 9 for use for loading identification numbers—gene information for loading a conversion table between identification numbers—gene information from the storage medium of the main body of the game machine, which we shall describe later, search section 10 to retrieve the gene information of this portable electronic device 1 from the conversion table loaded in this RAM 9 for use for loading identification numbers—gene information using the identification number held in the identification-number holding section 4, timer 11 to generate continuously time information, and display section 12, which displays a character image based on the character information generated at said character-information generation section 8.

Operation-information generation section 6, character-information generation section 8, and search section 10, mentioned here, constitute control section 13, which is composed of, for instance, a central processing unit (CPU).

The identification number held in identification-number section 4 is a proper identification number for this portable electronic device 1, and the same number does not exist elsewhere. Because of this, if gene information is determined corresponding to this identification number, the proper gene information can be accessed at will.

The same identification number (the same as this identification number) and gene information are recorded on a recording medium, such as an optical disk, for example. They are read out in said main body of the game machine, which is the host machine, and stored in RAM 9 for use for loading identification numbers—gene information via I/F 2.

Figures 3, 4:
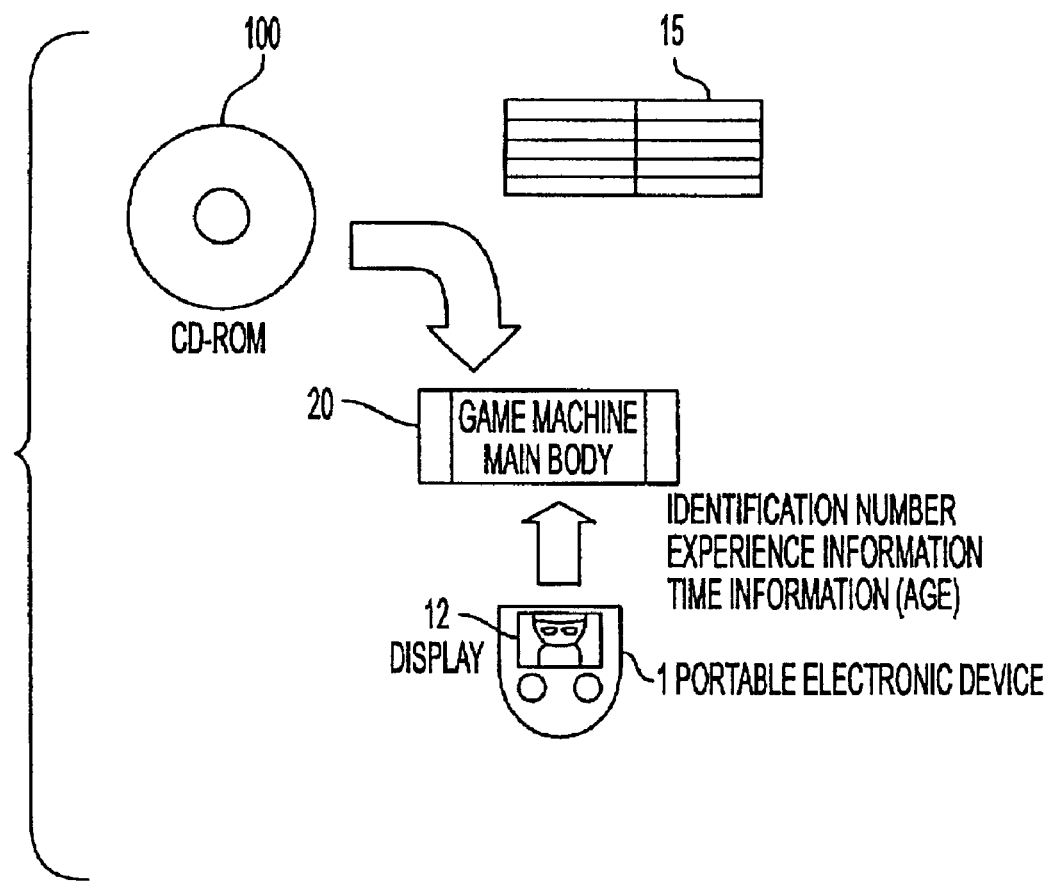
FIG. 3 shows a table of conversion between the identification numbers and the gene information.
FIG. 4 shows the relationship between the portable electronic device of the present invention and the game-machine main body.

Gene information is retrieved, at search section 10 of control section 13, referring to a conversion table, such as conversion table 15 shown in FIG. 3, loaded in RAM 9 for use for loading identification numbers—gene information. The gene information obtained by the search at search section 10 is sent to character-information generation section 6.

The operation-information generation section 6 generates operation information, which can be called an experience value, in response to the input operation by the player using input-operation section 5. An experience value is arrived at by converting one's experiences—such as for example, one has had many happy experiences, or many hard experiences, or has studied much, or has exercised much—into a numerical value. This experience value is stored in RAM 7 for use for operation information. A person who grew up with many happy experiences has a smiling face. A person who grew up with many hard experiences has a fearless face. If one studies much, he ends up wearing glasses. If one exercises much, his face becomes tanned. The parameters such as study, exercise, hardship, are assigned to the keys or buttons set at the input-operation section 5. The player can determine the experience value by pushing these keys or buttons a desired number of times. The operation-information determination section 6 has RAM 7 for use for operation information to store that experience value. Operation information such as the above experience value from this RAM 7 for use for operation information is supplied to character-information generation section 8.

The character-information generation section 8 is supplied with, in addition to the operation information, such as the above-noted experience value, gene information from search section 10, and time information (age) from timer 11. Thereupon, character-information generation section 8 generates character information for the portable electronic device 1 at that point in time, using said gene information, time information (age), and operation information, and has it displayed on display section 12 as an imaginary living being.

FIG. 4 shows the relationship between portable electronic device 1, game-machine main body 20, and CD-ROM 100. If portable electronic device 1 is connected to game-machine main body 20, a video-game apparatus, which is a specific example of an entertainment system of the present invention, is composed. Character images are displayed in the display section 12 of portable electronic device 1.

Figure 5:
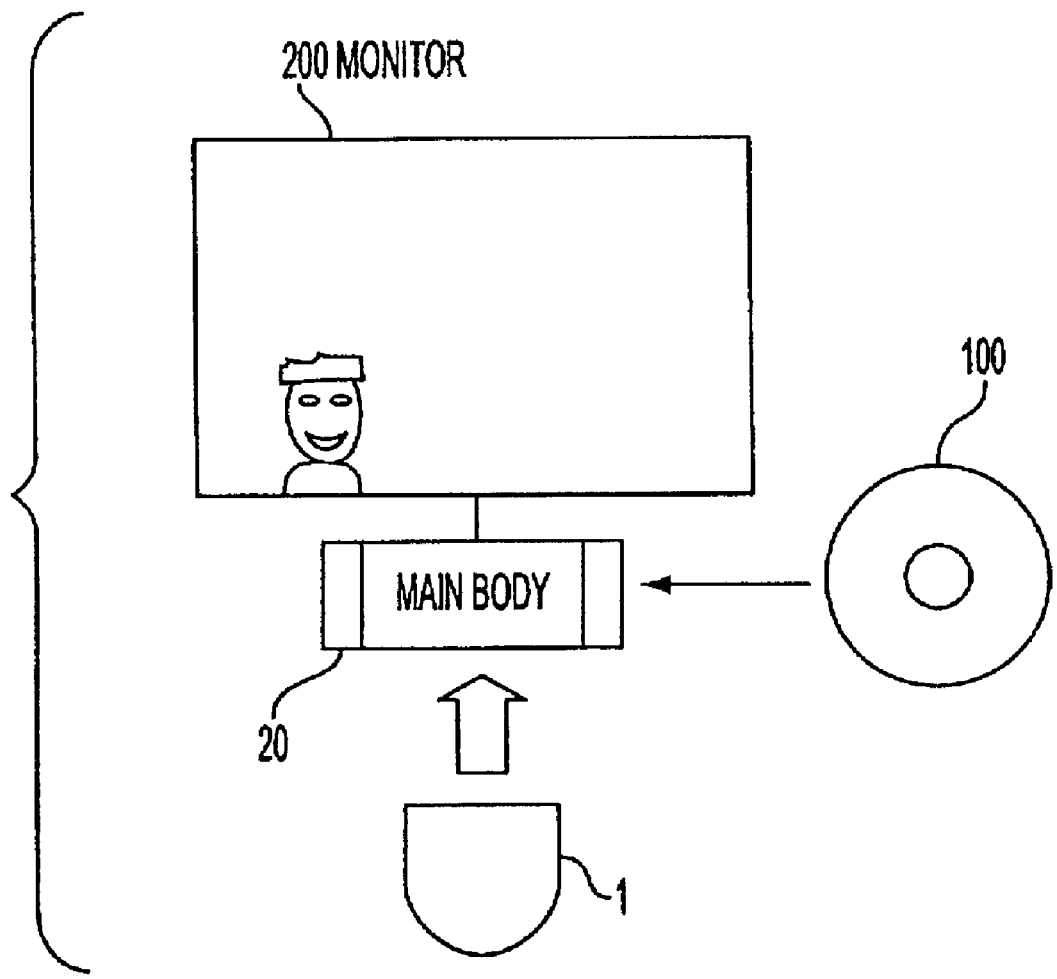
FIG. 5 is a schematic view of a video-game system in which a monitor device is connected to the game-machine main body.

Also, as for the video-game apparatus, a monitor device 200, such as, for example, a television image-receiving device, can be connected to game-machine main body 20, as shown in FIG. 5. In such a case, character information generated at the character-information generation section 18 is sent to the game-machine main body 20 via I/F 2, goes through a specified processing, and is displayed on monitor device 200 as a character image.

Figure 6:
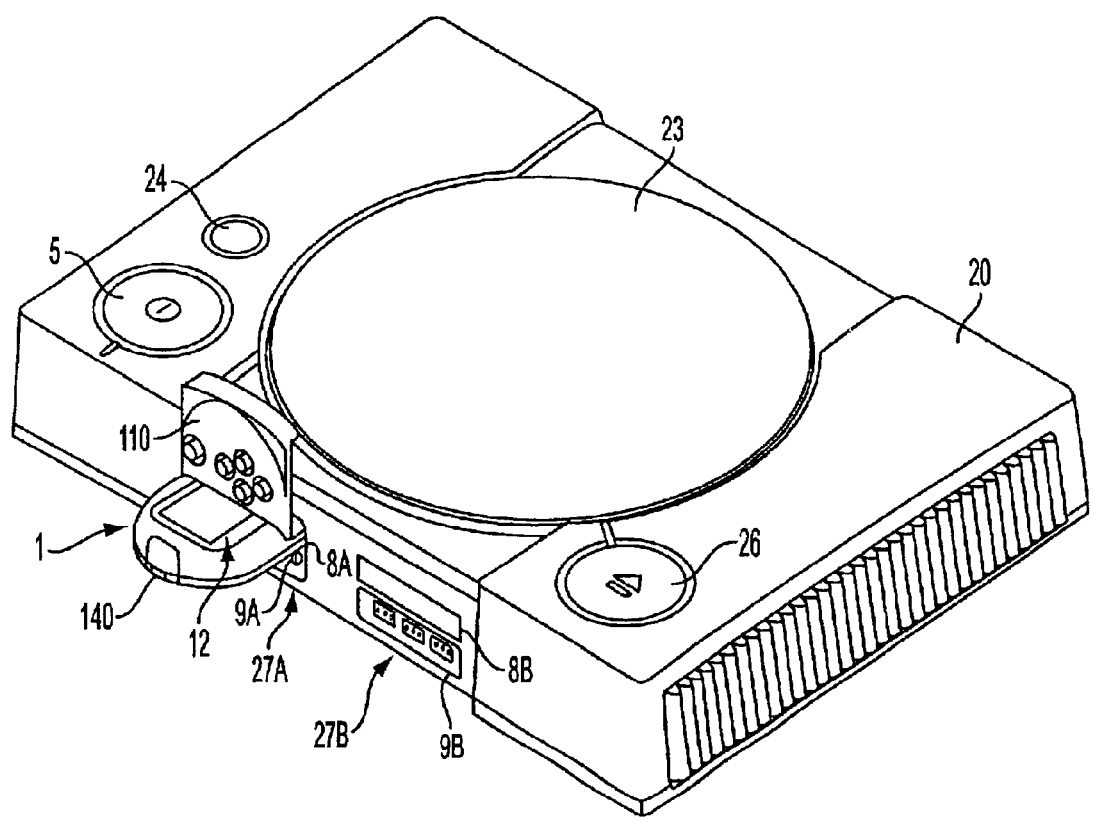
FIG. 6 is a perspective view of the main body of the game-machine when a portable electronic device is connected thereto.

The state in which the portable electronic device 1 is connected to game-machine main body 20 is shown in FIG. 6 as a video-game apparatus.

The game-machine main body 20 is housed in a quasi-square box. In its center section are located the disk-mounting section 23, where an optical disk such as a CD-ROM, which is a recording medium for supplying application programs such as a video game, is installed, a reset switch 24 to reset a game at will, a power switch 25, a disk-operating switch 26 to operate installation of said optical disk, and two slot sections, 27A and 27B, for example.

Figure 7:
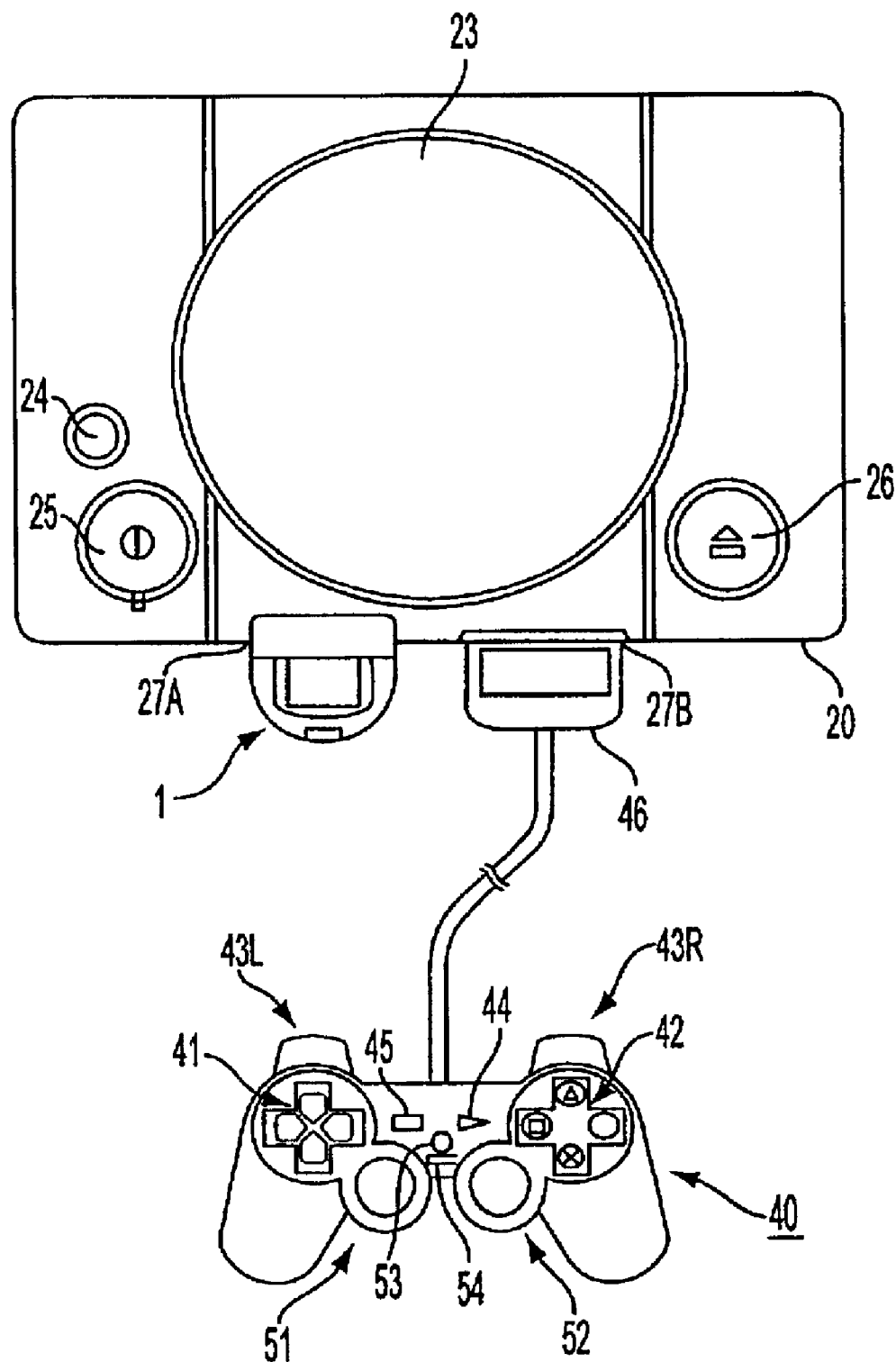
FIG. 7 is a plan view of the main body of the game-machine shown in FIG. 6 when an input-operation device is connected thereto.

As shown in FIG. 7, the portable electronic device 1 is inserted into each of the slot sections, 27A and 27B. Also, an input-operation device 40, as shown in FIG. 7, can be connected to each of the portable electronic devices, thus enabling two users to engage in a win-lose game. Also, although FIG. 6 shows as an example a structure where two-channel slot sections 27A and 27B are arranged, the number of channels is not limited to two.

The operation device 40 has the first and the second operation sections, 41 and 42, L button 43L, R button 43R, start button 44, and selection button 45. In addition, it has operation sections 51 and 52, which can be operated analogically, a mode-selection switch 53, which makes it possible to choose the operation mode of these operation sections 51 and 52, and a display section 54, for displaying the selected operation mode. Further, a vibration-giving mechanism, which is not shown in the drawings, is arranged inside operation device 40.

Figure 8:
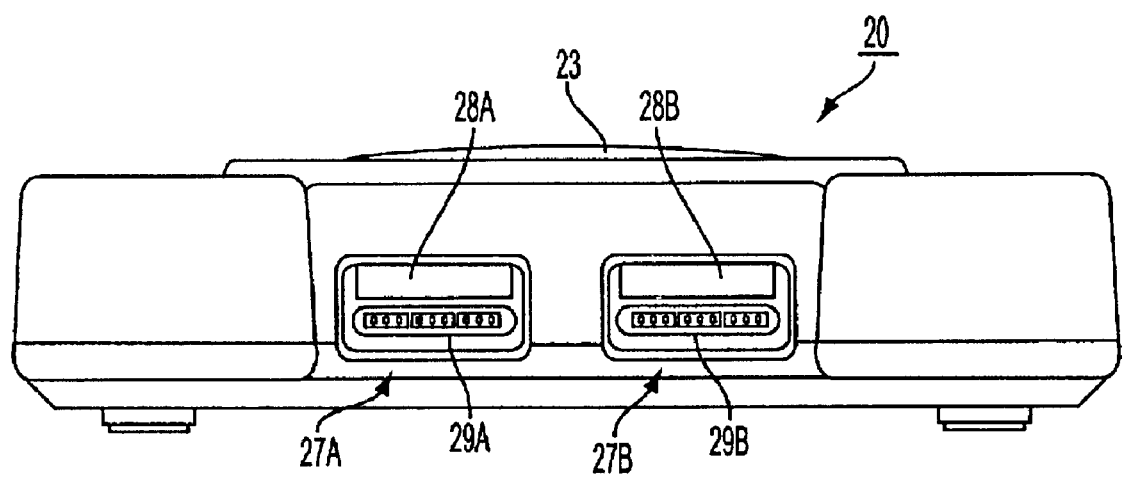
FIG. 8 is a front view of the main body of the game-machine.

FIG. 8 shows slot sections 27A and 27B, which are arranged on the front panel of said game-machine main body 20.

In the game-machine main body 20, slot sections 27A and 27B are each formed in two stages. In the upper stage are provided insertion sections 28A and 28B into which portable electronic device 1 is to be inserted, and in the lower stage are provided controller connection sections (jacks) 29A and 29B into which connection terminal section (connector) 46 of controller 40 is connected.

Figure 9:
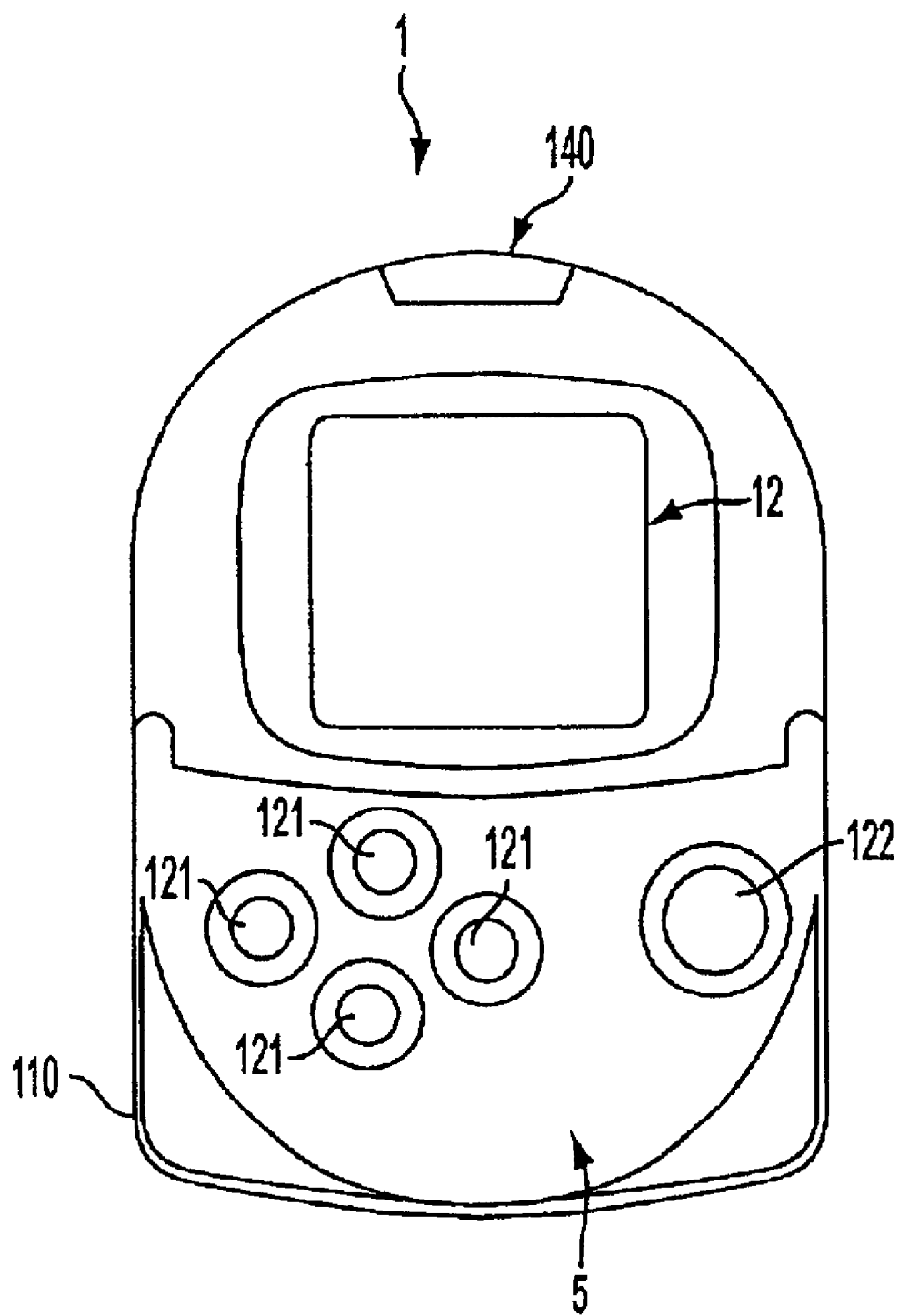
FIG. 9 is a plan view of the portable electronic device.
Figure 10:
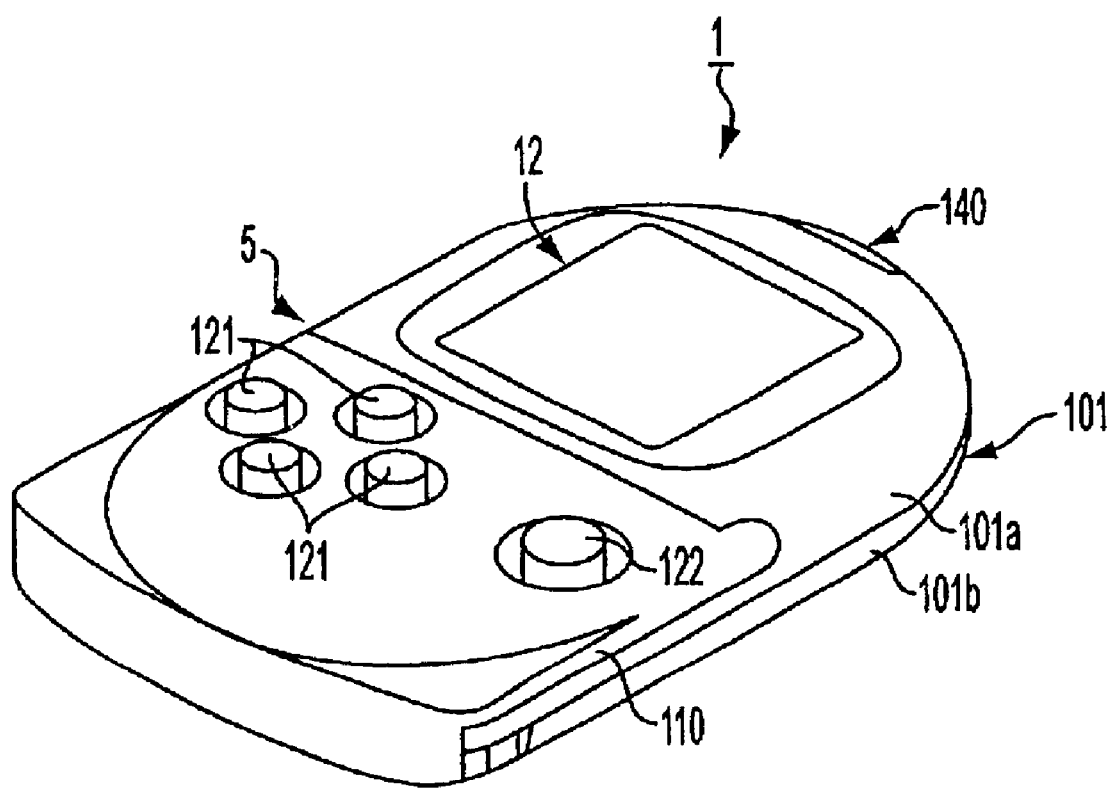
FIG. 10 is a perspective view of the portable electronic device of FIG. 9.
Figure 11:
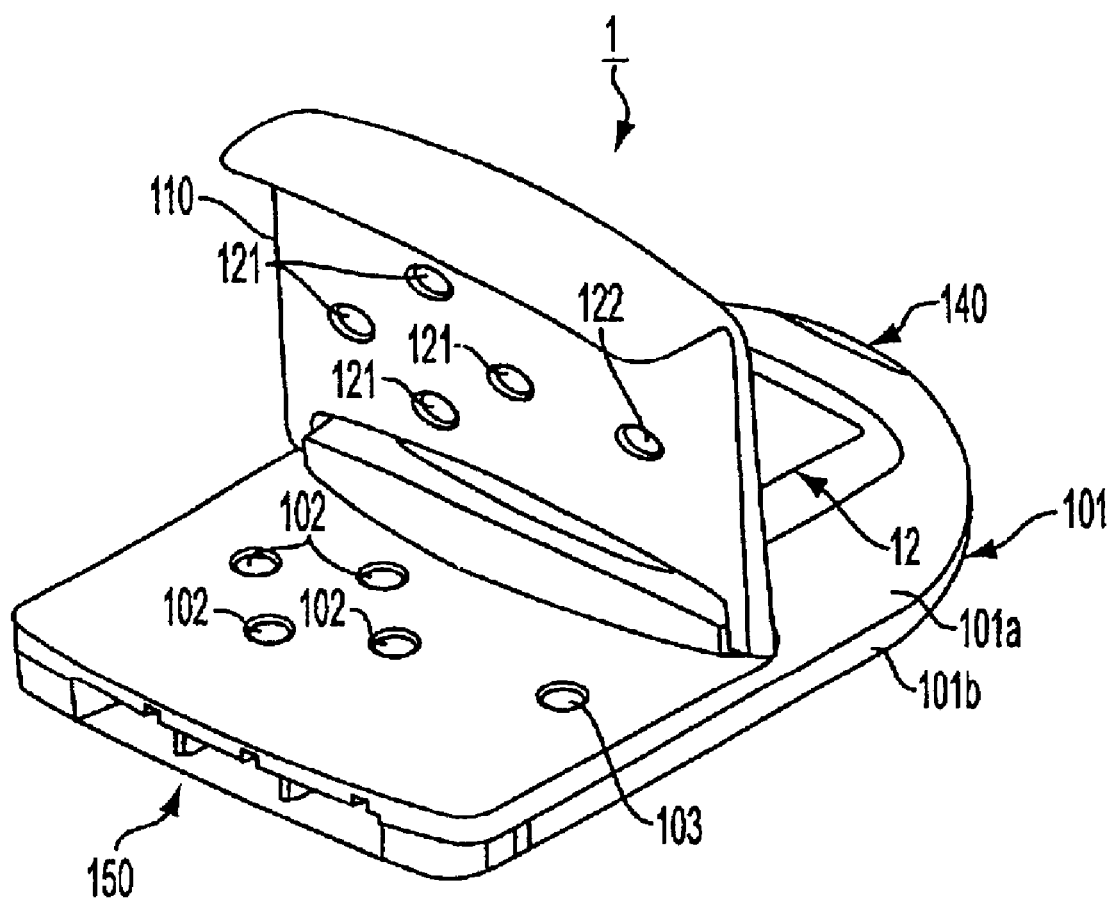
FIG. 11 is another perspective view of the portable electronic device.

Also, FIGS. 9-11 show the appearance of portable electronic device 1. FIG. 9 is a plan view of portable electronic device 1; FIG. 10 is a perspective view of the device with its cover-section part 110, for protecting the connector section, closed; FIG. 11 is a perspective view of the device with its cover-section part 110 open.

As shown in FIGS. 9-11, portable electronic device 1 has housing 101 in which are arranged an input-operation section 5 having one or more than one operator-elements 121 and 122 to do event-inputting or to make various selections, a display section 12 made of a liquid crystal display (LCD), and a window section 140 to do wireless communication by infrared rays for example, using a wireless communication means, which will be described later.

Housing 101, includes an upper shell 101a and a lower shell 101b and contains a substrate on which memory elements are mounted. The housing 101 can be inserted into slot sections 27A and 27B of game-machine main body 20. On the side face of one end is provided a connector section 150 where a rectangular window is formed.

The window section 140 is arranged at the other end section of the housing 101, which is formed approximately in a semicircular shape. The display section 12 is located on the top face of the housing 101, occupies about half of the top face section, and is arranged close to window section 140. The input-operation section 5 is also located on the top face section of the housing 101, occupies about half of this top-face area, and is arranged in a section that is opposite window section 140. The input operation section 5 is formed in an approximate square and is supported in a way that it can be moved vis-a-vis housing 101. It is composed of cover-section part 110 having multiple operator-elements 121 and 122 and switch-push sections 102 and 103, which are arranged in a position that is covered or uncovered by said cover-section part 110.

Operator-elements 121 and 122 are installed through the cover-section part 110 from its top-face side to its bottom-face side. The operator-elements 121 and 122 are supported by the cover-section part 110 in such a way that they can move in the up-and-down direction vis-a-vis the top-face section of the cover section.

The switch-push sections 102 and 103 have push buttons, which are supported by the housing 101 in a way that they can move in the up-and-down direction vis-a-vis the top-face section of housing 101. These push buttons, when they are pushed from above, push in turn the push switches, such as, for example, diaphragm switches, which are arranged on the substrate inside housing 101.

The switch-push sections 102 and 103 are arranged in positions that correspond to the positions of the operator-elements 121 and 122, respectively, when the cover-section material 110 is in a closed state. In other words, when the cover-section part 110 is in a closed state, if the operator-elements 121 and 122 are pushed from above in the direction to make them sink into the top-face section of this cover-section part 110, these operator-elements 121 and 122 push down in turn the corresponding push switches inside the housing 101 via the push buttons of the corresponding switch-push sections 102 and 103.

Figure 12:
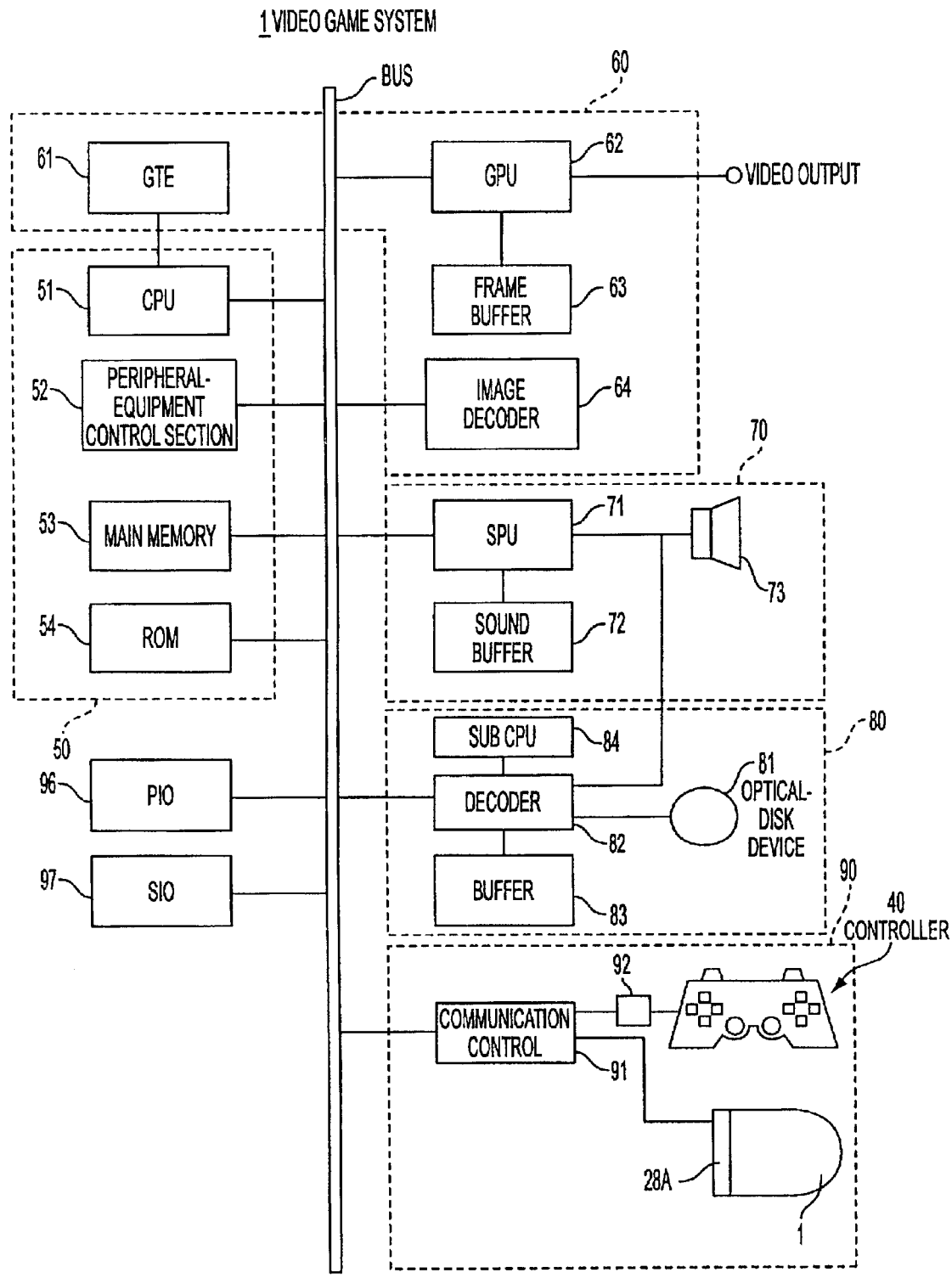
FIG. 12 is a block diagram showing the configuration of the main body of the game-machine.

Next, we show in FIG. 12 an outline of the circuit configuration of the major part of game-machine main body 20. The circuit configuration is shown in a state where the portable electronic device 1 and the input-operation device 40 are connected.

This game-machine main body 20 is composed of a control system 50 made of a central processing unit (CPU) 51 and its peripheral equipment, a graphic system 60 made of a graphic processing unit (GPU) 62, which draws pictures on frame buffer 63, a sound system 70 made of a sound processing unit (SPU), which produces musical and effect sounds, an optical-disk control section 80, which controls the optical disk in which are stored application programs, an input-operation device 40, with which a user inputs his instructions, a communication-control section 90 to control input/output of data from portable electronic device 1 and a bus (BUS) to which each of the above parts is connected.

Said control system 50 is equipped with a main memory 53—made of a CPU 51, a peripheral-equipment control section 52, which performs interrupt control and direct-memory-access (DMA) transfer control, and a random-access-memory (RAM)—and a read-only-memory (ROM) 54, in which are stored programs such as a so-called operating system, which manages the main memory 53, the graphic system 60 and the sound system 70. Furthermore, the main memory mentioned here refers to a memory in which a program can be executed.

Said CPU 51 controls the entire video-game device 1 by executing the operating system stored in the ROM 54 and is made of, for example, a 32-bit RISC-CPU (Reduced Instruction Set Computer-CPU).

Once power is supplied to this game-machine main body 20, the CPU 51 of said control system 50, by executing the operating system stored in the ROM 54, controls said graphic system 60 and sound system 70. Also, upon execution of the operating system, CPU 51, after initializing the entire game-machine main body 20 such as performance checking, controls said optical-disk control section 80 and executes application programs such as games that are stored in the optical disk. By executing a program such as a game, the CPU 51, in response to the input by a user, controls said graphic system 60 and sound system 70 and controls display of images and generation of effect or musical sounds.

Also, said graphic system 60 has a geometry transfer engine (GTE) 61, the GPU 62, which draws pictures according to the draw-picture instructions from the CPU 51, the frame buffer 63, which stores images drawn by this GPU 62, and the image-decoder 64, which decodes the image data that were compressed by cross conversion such as discrete cosine conversion and were encoded.

GTE 61 is provided, for example, with a parallel operation mechanism, which can perform multiple operations in parallel. In response to a demand for operation from said CPU 51, it can perform various high-speed operations such as transformation of the coordinate system, light-source calculation, or matrix or vector. In concrete terms, in the case of an operation to do flat shading when drawing pictures of a triangle-shaped polygon with the same color, for example, this GTE 61 can perform a maximum of about 1.5 million computations per second of the polygon's coordinates. By this, the load on the CPU 51 is reduced, while, at the same time, a high-speed computation of coordinates is made possible, in this video-game device.

Also, GPU 62 draws pictures of polygons for the frame buffer 63, following a draw-picture command from the CPU 51. This GPU 62 can perform a maximum of about 360,000 drawings of polygons per second.

In addition, the frame buffer 63 is made of a dual-port RAM and can handle picture-drawing by the GPU 62 or transfer from the main memory and readout for display at the same time. The frame buffer 63 has a capacity of 1 M bytes, for example. Each is treated as a 16-bit matrix made of 1024 picture elements horizontally and 512 picture elements vertically. Also, in this frame buffer 63 are arranged, other than a display area output as a video output, a CLUT (color look-up table) area where a color-look-up table that is referred to when the GPU 62 draws pictures of polygons, etc., is stored, and a texture area where textures that are mapped into the polygons drawn by GPU 62 after executing coordinate conversion are stored. The CLUT area and texture area are programmed to change dynamically according to changes in the display area.

In addition, GPU 62 is able to perform, other than the above-noted flat shading, glow shading by which the color inside of a polygon is determined by supplementing the color of the polygon's apex and texture mapping by pasting on the polygon a texture stored in said texture area. When performing glow shading or texture mapping, said GTE 61 can perform a maximum of about 500,000 computations per second of the polygon's coordinates.

In addition, the image-decoder 64 decodes the image data of still or animated pictures stored in the main memory 53 under the control of said CPU 51, and they are again stored in main memory 53.

Also, these reproduced image data, stored in frame buffer 63 via GPU 62, can be used as a background for images drawn by GPU 62.

The sound system 70 includes a SPU 71, which generates musical or effect sounds based on the instructions from the CPU 51, the sound buffer 72, which records wave-form data generated by SPU 71, and the speaker 73, which outputs musical or effect sounds generated by the SPU 71.

SPU 71 has an ADPCM (Adaptive Differential PCM) decoding function to reproduce voice data (16-bit data) that have been encoded through an ADPCM process as 4-bit differential signals, a sound-reproducing function to generate effect sounds by reading out the wave-form data stored in the sound buffer 72, and a modulation function to reproduce the wave-form data stored in the sound buffer 72 after modulating them.

Due to the above functions the sound system 70 can be used as a so-called sampling sound source that generates musical or effect sounds based on the wave-form data stored in the sound buffer 72 according to the instructions from the CPU 51.

The optical-disk control section 80 is equipped with optical-disk device 81 to reproduce programs or data stored in an optical disk, a decoder 82 to decode programs and data to which error-correction codes (ECC) have been added prior to being stored, and a buffer 83, which enables high-speed readout of data from an optical disk by storing temporarily data from optical-disk device 81. A subordinate CPU 84 is connected to the decoder 82.

Also, as voice data stored in an optical disk that are read out by optical-disk device 81, there are, other than the above-described ADPCM data, so-called PCM data, which are obtained by analog/digital conversion of voice signals.

Voice data stored as ADPCM data by encoding 16-bit digital data as 4-bit differential signals are decoded by decoder 82. They are then supplied to SPU 71 where they go through a digital/analog conversion process. After this, they are used to drive speaker 73.

Also, voice data stored as 16-bit digital data as PCM data are decoded by decoder 82 and then used to drive the speaker 73.

In addition, communication-control section 90 is provided with a communication controller 91 to control communication with the CPU 51 via the BUS. In the communication controller 91 are provided the controller connection section 90, to which the input-operation device 40 to input instructions from a user is connected, and the insertion section 28A to which the portable electronic device 1 is connected.

The input-operation device 40 connected to the controller connection section 92 has, for example, 16 instruction keys to input instructions from a user. The state of these instruction keys is transmitted about 60 times per second to the communication controller 91 by synchronous communication, and the communication controller 91 sends the state of instruction keys of the input-operation device 40 to the CPU 51.

By this, instructions from a user are entered into the CPU 51, and the CPU 51 performs processing according to the instructions from a user based on the game program that is being executed.

Among the above-described various elements, such as the main memory 53, the GPU 62, the image-decoder 64, and the decoder 82, etc., it becomes necessary to transfer a large amount of image data at a high speed when images are displayed or pictures are drawn. Therefore, in this game-machine main body 20, it is made possible to do a so-called DMA transfer, that is, to transfer data directly between said main memory 53, the GPU 62, the image-decoder 64 and the decoder 82, under the control of the peripheral-device control section 52, without going through the CPU 51 as described above. This makes it possible to reduce the load put on the CPU 51 by data transfer and to do a high-speed data transfer.

Also, CPU 51, when it is necessary to store the setting data of a game that is being executed, sends the data to be stored to the communication controller 91. Thereupon, the communication controller 91 writes the data from the CPU 51 into a memory card—not shown in drawings—or into the portable electronic device 1, which are inserted into the insertion sections 28A or 28B.

The communication controller 91 contains within it a protective circuit to prevent electrical damage. Both the memory card and portable electronic device 1 are separated from the BUS and can be connected or disconnected while the main body of the device is connected to the power. Therefore, in the case where there isn't enough memory capacity left in the memory card or portable electronic device 1, a new memory card can be inserted without interrupting power to the main body. Because of this, game data that need to be kept in a backup system are not lost. One can insert a new memory card and write in it the necessary data.

Also, the parallel I/O interface (PIO) 96 and the serial I/O interface (SIO) 97 are interfaces to connect said memory card or portable electronic device 1 to the game-machine main body 20.

Figure 13:
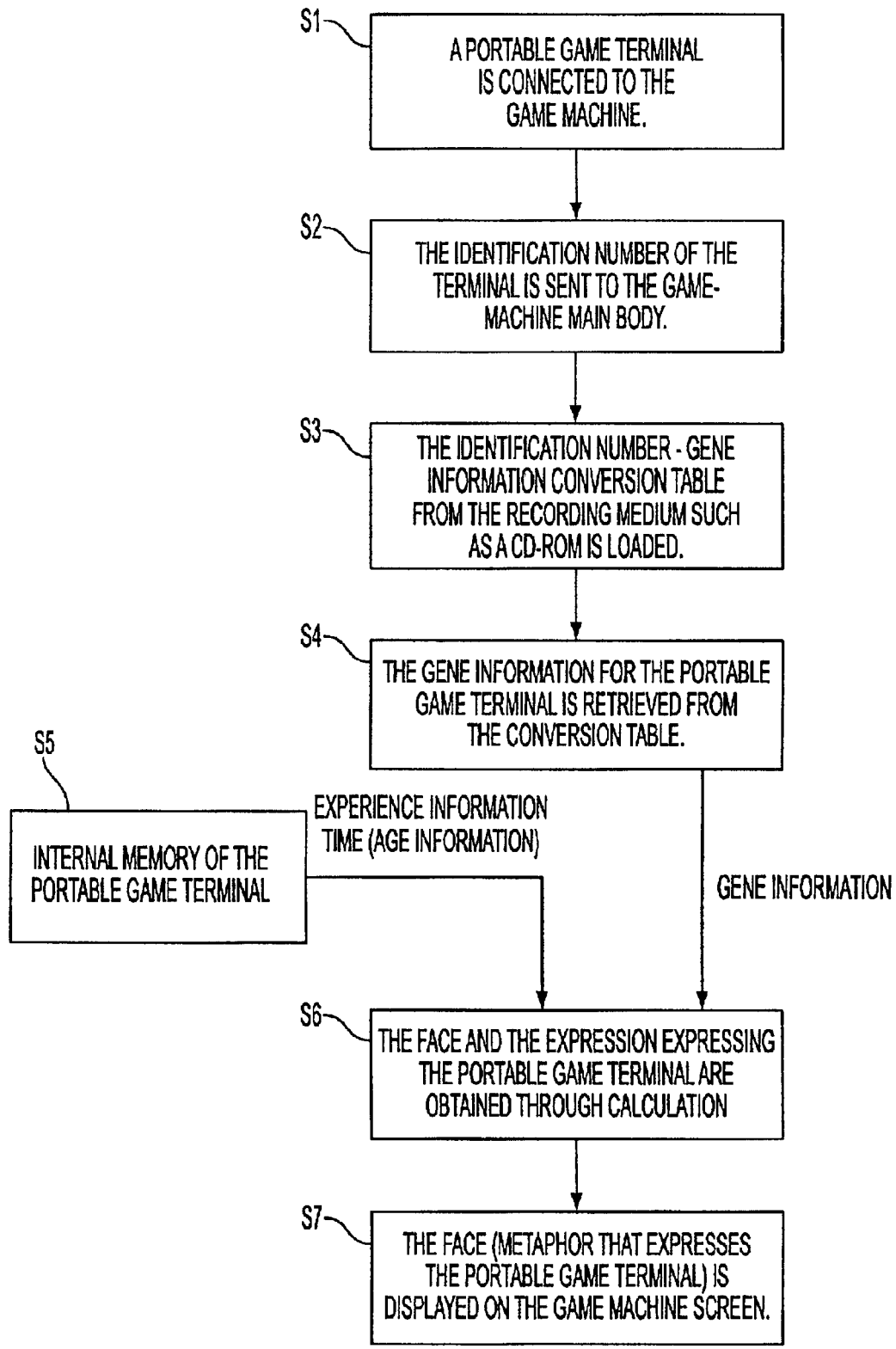
FIG. 13 is a flowchart for explaining the operation of the portable electronic device.

Because of this, if one connects the game-machine main body 20 into which the portable electronic device 1 is inserted and the monitor device 200, as shown in FIG. 5, and has the control section 13 of the portable electronic device 1 perform a process as shown in FIG. 13, one can have the monitor device 200 display a character image that treats the portable electronic device 1 at that point as an imaginary living being. Also, in FIG. 13, the portable electronic device 1 is noted as the "portable game terminal."

First of all, the player connects in Step S1 the portable game terminal 1 to the game-machine main body 20. This is realized by inserting the connector section 150 of the portable game terminal 1 into the insertion sections 28A or 28B of the slot sections 27A or 27B.

Next, in Step S2, the identification number of the portable game terminal is sent to the game-machine main body 20. In Step S3, the identification numbers—gene information conversion table is sent from the CD-ROM. It is loaded onto the RAM 9 for use for loading the identification numbers—gene information. Then, the CPU 51 of the game-machine main body has to check the identification number, which is sent from the game terminal 1, and has to decide whether or not this number is handled in the conversion table stored in the CD-ROM.

In Step S4, the search section 10 retrieves from the RAM 9 for loading the identification numbers—gene information the gene information that corresponds to the portable game terminal 1. This gene information is sent to the character-information generation section 8.

On the one hand, in Step S5, the operation information such as an experience value (it is noted in the drawing as the experience information) and the age information are sent to the character-information generation section 8 from the RAM 7 for use for the operation information, which is a memory contained within the portable game terminal 1.

Thereupon, in Step S6, the character-information generation section 8 obtains by calculation the character information concerning the face and the expression that the portable game terminal 1 has at that point in time. In Step S7, this character information is sent to the CPU 51 of the game machine main body 20. After having it go through a specified graphic generation process, it is displayed in the monitor device 200. In addition, when a character image is displayed in the display section 12 located on the portable game terminal 1, it is sufficient to send the character information to the display section 12 at Step S7.

Figure 14:
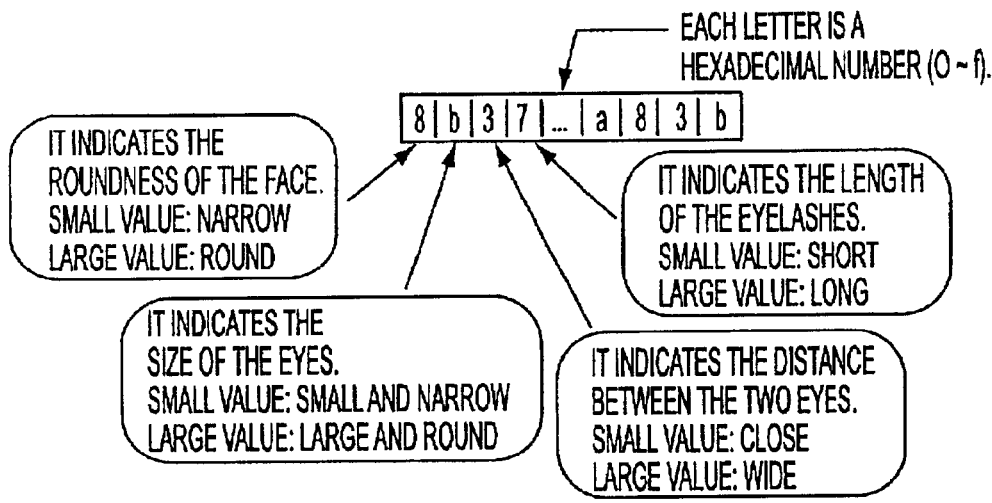
FIG. 14 shows a specific example of the gene information.

The above-noted gene information will be now explained. Although, as shown, it uses alphabetic characters, ABCDEF . . . , in the conversion table in FIG. 3, it is expressed actually with hexadecimal numbers (0~f) as shown in FIG. 14. As a concrete example, it is noted in FIG. 14 as "8b37 . . . a83b." Here, the leftmost character ("8" in the concrete example) expresses the roundness of the face. If this value is small, it indicates a narrow face, and if the value is large, it indicates a round face. The next letter ("b" in the concrete example) indicates the size of the eyes. A small value indicates small and narrow eyes, and a large value indicates large and round eyes. The next character ("3" in the concrete example) indicates the distance between the eyes. If its value is small, this area is narrow, and if the value is large, it is wide. The next character ("7" in the concrete example) indicates the length of the eyelashes. A small value indicates short eyelashes, and a large value indicates long eyelashes.

Figure 15:
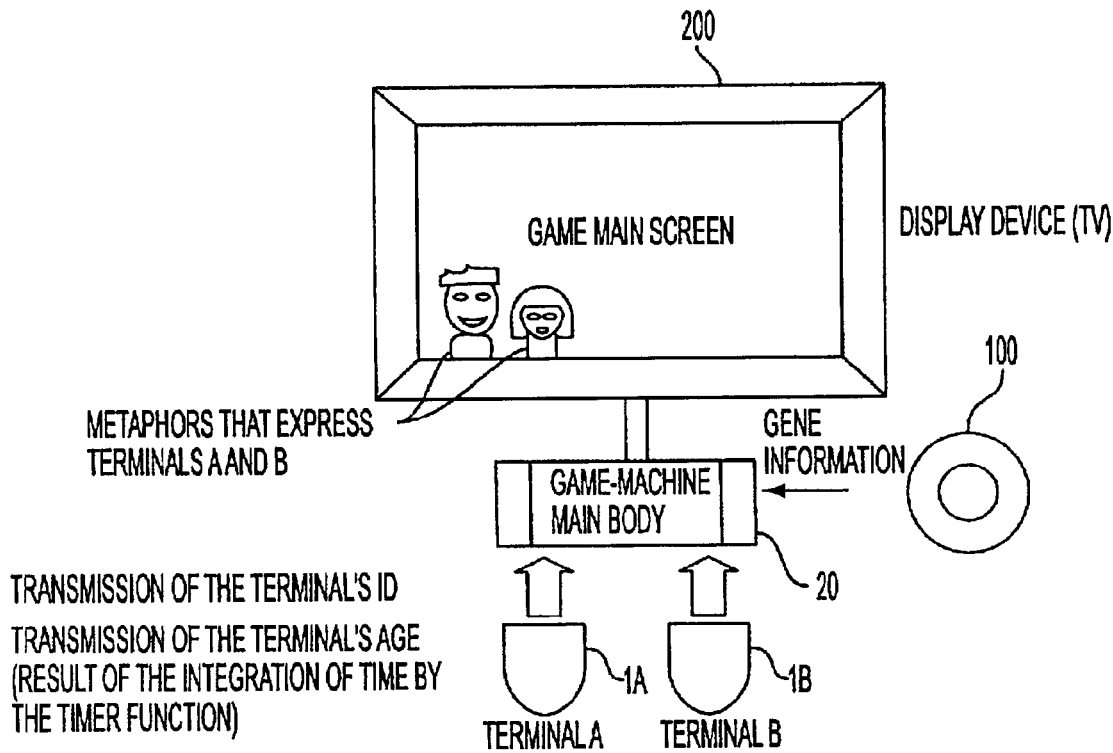
FIG. 15 shows an outline of a video-game system in which two portable game terminals are mounted on the main body of the game-machine.

Further, although we show, in FIGS. 4 and 5, concrete examples of an entertainment system (a video-game apparatus) in which only one portable game terminal 1 is mounted on the game-machine main body 20, one can also think of a video-game device on which two of them—the portable game terminals 1A and 1B—are mounted, as shown in FIG. 15.

According to the video-game device shown in this FIG. 15, the character-information generation section 8 synthesizes the character information (the face) from the age information obtained by integrating the identification numbers of 1A and 1B of the portable game terminals and the timer time, and (this face) is displayed on the monitor device 200 as metaphors that express each of the terminals. In this way, it becomes possible to have an expression that personifies each of the terminals.

Figure 16:
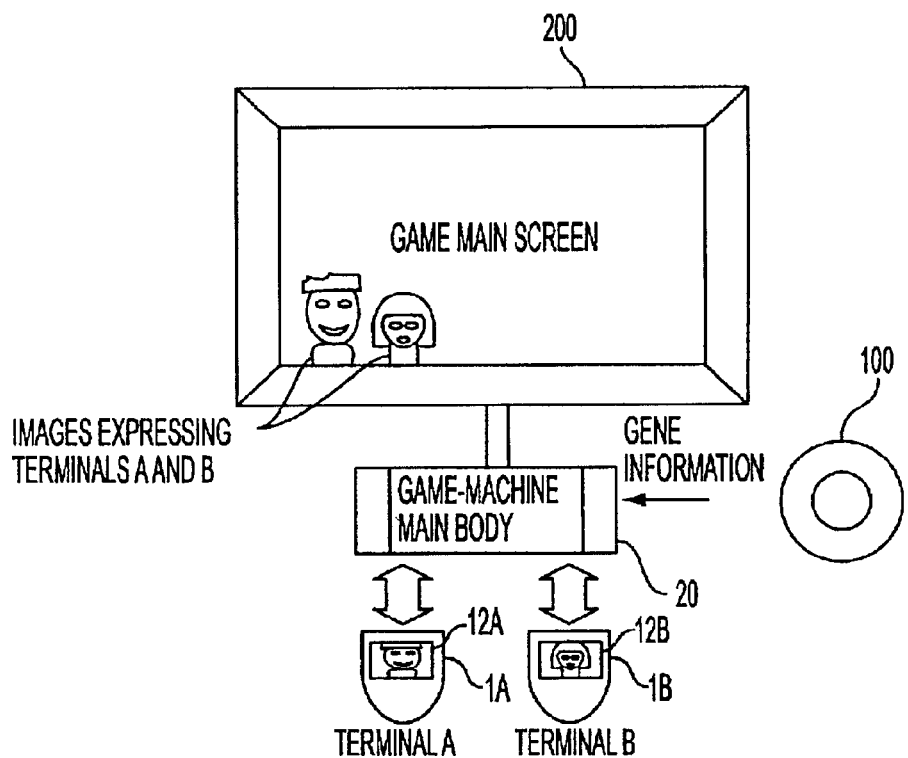
FIG. 16 shows an outline of another video-game system in which two portable game terminals are mounted on the main body of the game-machine.

Naturally, as is shown in FIG. 16, it can be shown also on the display sections 12A and 12B of the portable game terminals 1A and 1B as metaphors that express each of the terminals.

Figure 17:
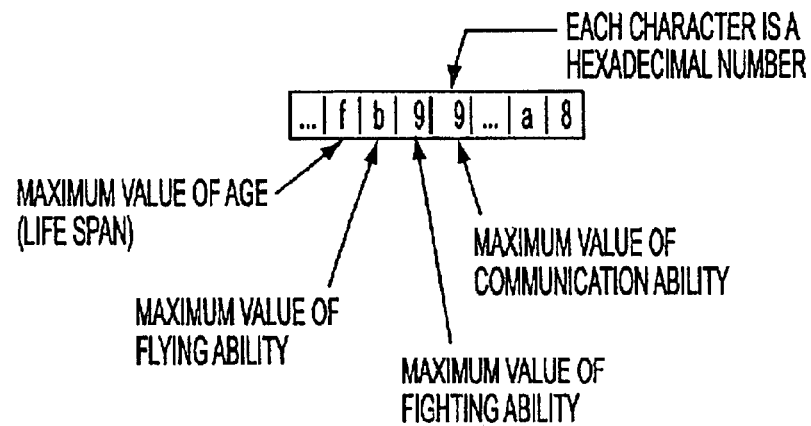
FIG. 17 shows a specific example of an expression of a personality by gene information.

Also, one can express the individual character by filling each item of said gene information with the maximum value of the latent ability which that individual has. In FIG. 17 is shown a concrete example of an expression of an individual character by the gene information. In the clause where "f" is noted, is written the maximum value for the age, in other words, the life span. In the clause where "b" is noted, is written the maximum value for the flying ability. In the clause where "9" is noted, is written the maximum value for the fighting ability. Also, in the clause where the second "9" is noted, is written the maximum value for the communication ability. Hexadecimal notation is used for each clause.

Also, by putting in information that indicates the affinity between individuals in the gene information, it is possible to express the relationship between individuals—whether these individuals cooperate with each other or are hostile to each other during a game.

Also, two portable game terminals 1A and 1B (FIG. 18) that are connected to the game-machine main body 20 generate character information related to an imaginary subordinate machine in accordance with their respective gene information and operation information, on receiving gene information corresponding to said proper identification number through the game-machine main body 20.

Figure 18:
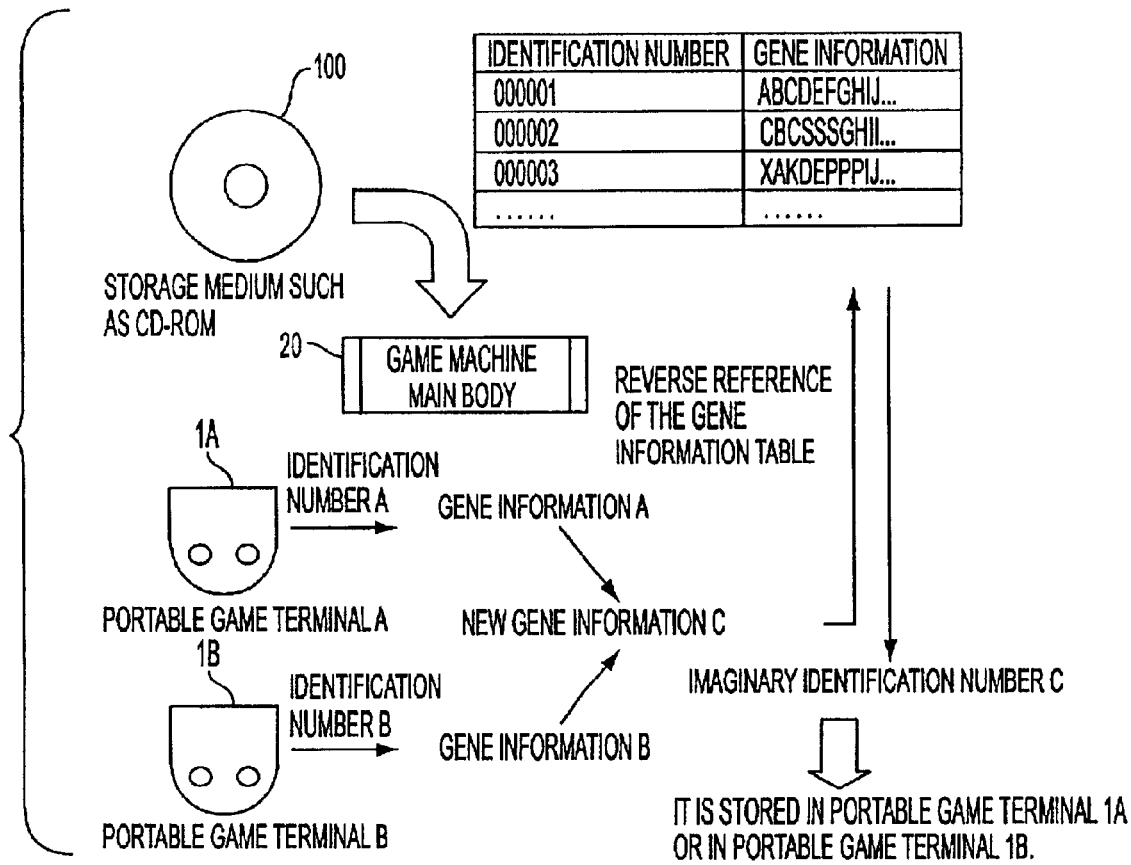
FIG. 18 is a view to explain how an imaginary new life form is born through mating between two different portable game terminals.

In other words, as shown in FIG. 18, one can have an imaginary, new life form come to life by way of a mating between the two different portable game terminals 1A and 1B. In this case, using new gene information C obtained from the gene information A and the gene information B of the two portable game terminals 1A and 1B, a new identification number is obtained by reverse reference of the conversion table between the identification numbers and gene information noted above. The identification number thus obtained is considered to be an imaginary identification number C of that portable game terminal and is stored in one of the portable game terminals 1A and 1B. Said two portable game terminals 1A and 1B are equipped with a RAM for use for storing character information to store the above-noted character information for this purpose.

Figure 19:
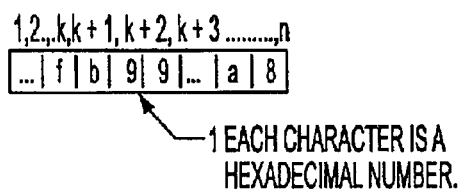
FIG. 19 shows how gene information is expressed via a one-dimensional array.

The gene information in this case is expressed by a one-dimensional array. The nth gene information of an individual a is noted as Sa(n). In that case, according to the gene information shown in FIG. 19, Sa (k+1) is b.

Figure 20:
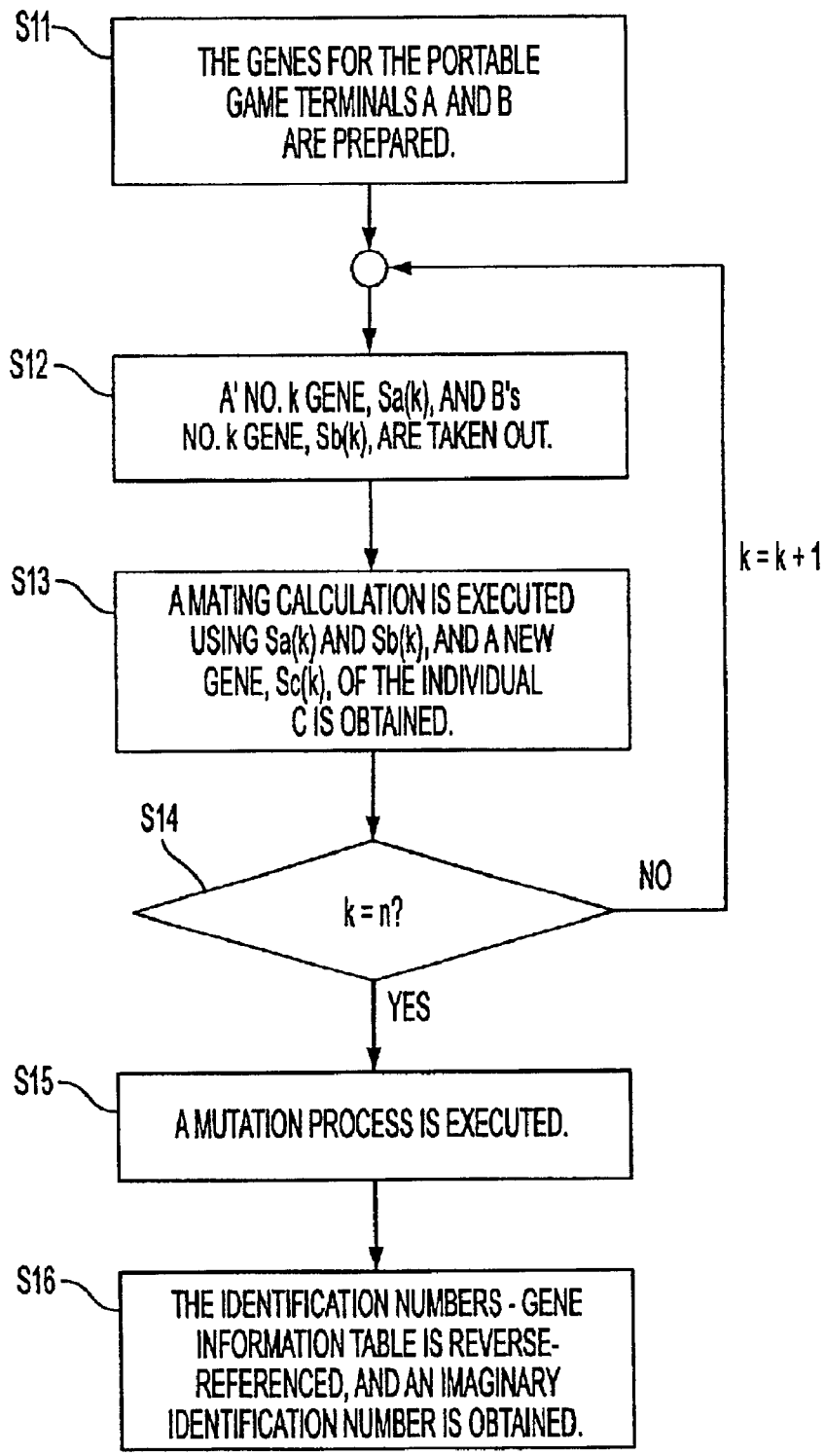
FIG. 20 is a flowchart for explaining the processes through which an individual C is born through mating between an individual A and an individual B.

Supposing that an individual C is born via a mating (crossing) between individual A and individual B, we show in FIG. 20 how to process this mating. First of all, in Step S11, the search section 10 prepares the gene information from the portable game terminals 1A and 1B. Then in Step S12, the character-information generation section 8 takes out individual A's No. k gene, Sa(k), and individual B's No. k gene, Sb(k); executes a mating calculation in Step S13; and obtains a gene, Sc(k), of a new individual C.

As a mating calculation at this Step S13, one can think of the following three algorithms. According to the first algorithm, when determining the value to be entered in the kth column for individual C's gene, a random number is used to select randomly the kth column of individual A or the kth column of individual B. According to the second algorithm, the average value of the kth column of individual A and the average value of the kth column of individual B are used to determine the value to be entered in the kth column of individual C's gene. According to the third algorithm, the linear interpolation of the kth column of individual A and the linear interpolation of the kth column of individual B are used to determine the value to be entered in the kth column of the individual C's gene. As for the coefficient of the linear interpolation, it is determined using a random number.

After repeating the above-described processes at Step S12 and at Step S13 until k reaches n, a mutation process is executed at Step S15. As for this mutation processing, the variation amount for certain columns after mating are determined by random numbers. In that case, a threshold limit is set, and those columns are corrected only when the random numbers exceed the threshold value. This Step S15 can be omitted.

And, at Step S16, the table between the identification numbers and the gene information is reverse-referenced, and an imaginary identification number for individual C is obtained. This imaginary identification number of individual C is stored in either the game terminal 1A or the game terminal 1B.

Figure 21:
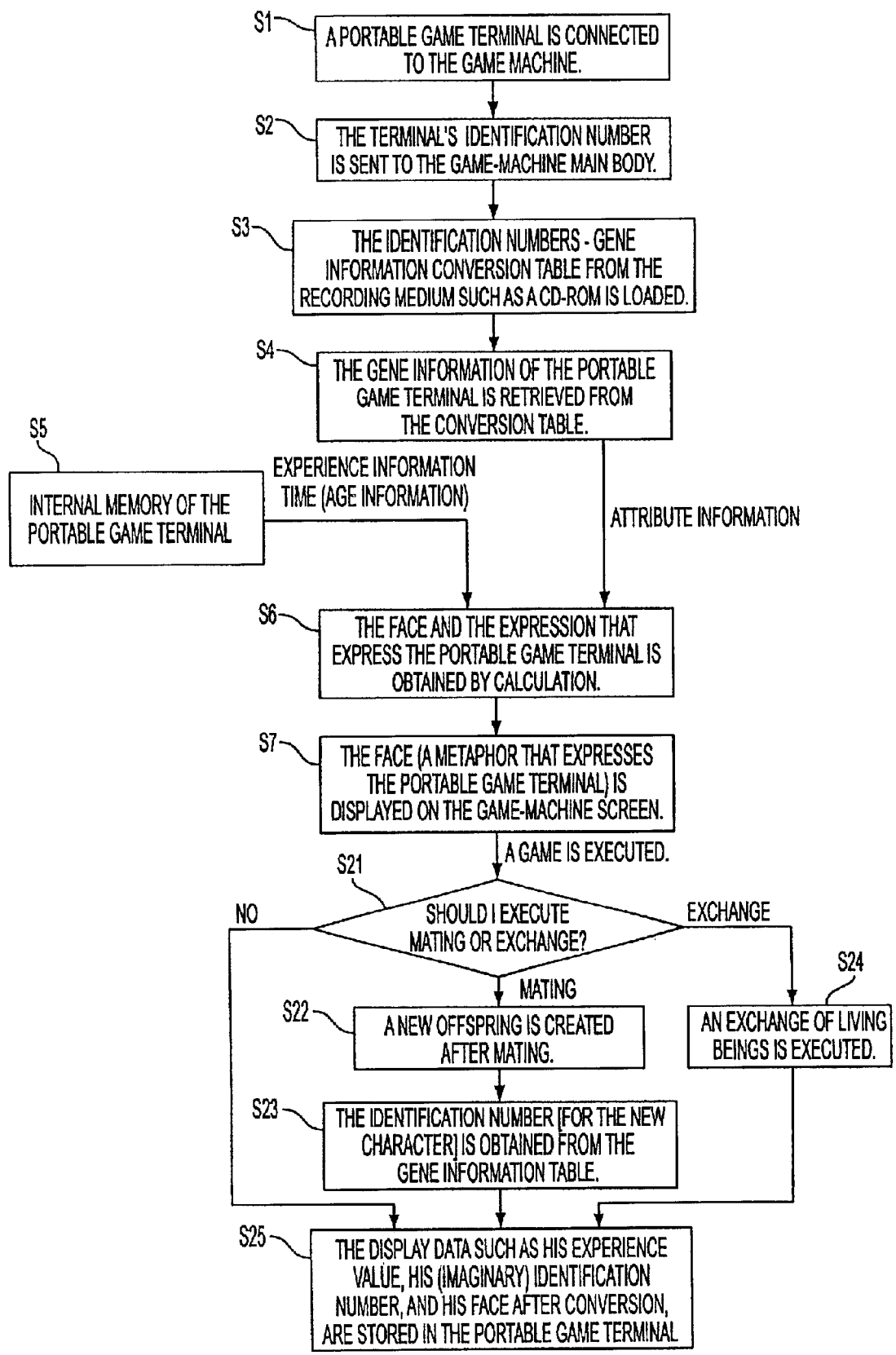
FIG. 21 is a flowchart showing the flow of processes when a game of mating or exchange is played using characters of two game terminals obtained through the processes shown in the flowchart in FIG. 13.

In addition, the flow of the processes is shown in FIG. 21 when playing a game of mating or exchange using the characters from game terminals 1A and 1B obtained through the process shown in the flowchart in the above-described FIG. 13.

The explanation of Step SI to Step S7 is omitted since it was given in the description of FIG. 13. Through the processing up to this point, two characters, a man and a woman, are displayed on the monitor device 200, as shown in FIG. 15.

At Step S21 of FIG. 21, the player decides whether to execute mating or exchange. If he chooses to execute mating, he proceeds to Step S22 and executes the mating through a process shown in the above-described FIG. 20. At Step S23, the identification number is reverse-referenced using the gene-information conversion table, and an imaginary identification number is obtained. Then he proceeds to Step S25 and stores in the RAM of one of the portable game terminal's experience values, the imaginary identification number, and the display data for the face after conversion, etc.

On the other hand, if the player decides to choose exchange at Step S21, he proceeds to Step S24 and executes an exchange of the two living beings, which are the two characters.

As explained above, the characters that are displayed by connecting the portable game terminals to the game-machine main body 20 can be those that are related to the game or those that are not related. By displaying such characters, the portable game terminals are personified and can entertain the user.

According to the present invention, one can give the user a sense of familiarity, for example, by generating a proper character using an identification number and by displaying it in the display means.

What is claimed is:

1. A portable electronic device, having an interface for connecting said portable electronic device to a host machine having a program-execution function, comprising:

an identification-number holder section for holding proper identification numbers;

a memory for loading a conversion table containing gene information corresponding to said proper identification numbers; and a character-information generation section for generating proper character information in accordance with at least said gene information.

2. The portable electronic device according to claim 1, further comprising:

an input-operation section for executing an input operation;

an operation-information generation section for generating operating information in response to said input operation at said input-operation section; and a memory for storing said operation information from said operation-information generation section, wherein said character-information generation section generates said proper character information in accordance with at least said gene information and said operation-information.

3. The portable electronic device according to claim 1, further comprising:

a timer for continuously generating time information, wherein said character information generation section generates said proper character information in accordance with at least said gene information and said time information.

4. The portable electronic device according to claim 1, further comprising:

a display section for displaying a character image based on said character information generated by said character information generation section.

5. The portable electronic device according to claim 1, wherein said character information generation section is adapted to transfer said character information to said host machine.

6. The portable electronic device according to claim 1, wherein said gene information comprises information regarding multiple portions of at least a face of an individual designated by a character image generated based on said character information, and wherein said information regarding multiple portions is given in the form of a one-dimensional array.

7. The portable electronic device according to claim 1, wherein said gene information comprises a one-dimensional array filled with maximum values of latent abilities of an individual designated by a character image based on said character information.

8. The portable electronic device according to claim 1, wherein, given said gene information as a first gene information and another gene information supplied from another portable electronic device connected to said host machine as a second gene information, said character information generation section generates another character information based on at least said first and second gene information.

9. The portable electronic device according to claim 8, wherein, given gene information from which said another character information are generated as third gene information, said character information generation section is adapted to determine k-th column of said third gene information from corresponding k-th columns of said first and second gene information through a predetermined rule, for $k=1,2,\ldots,n$.

10. The portable electronic device according to claim 9, wherein said character information generation section performs a mutation process in generating said third gene information.

11. The portable electronic device according to claim 10, wherein variation amount for certain columns in said third gene information are determined by random numbers in said mutation process.

12. The portable electronic device according to claim 9, wherein said predetermined rule is a selection rule for selecting either one of the k-th columns of said first and second gene information as the k-th column of said third gene information.

13. The portable electronic device according to claim 9, wherein said predetermined rule is a rule for calculating the average value of the k-th columns of said first and second gene information as the k-th column of said third gene information.

14. The portable electronic device according to claim 9, wherein said predetermined rule is a rule for using linear interpolation of k-th columns of said first and second gene information in determining the k-th column of said third gene information.

15. The portable electronic device according to claim 9, wherein said character information generation section is adapted to search said conversion table for a proper identification number corresponding to said third gene information.

16. The portable electronic device according to claim 15, further comprising:

a memory for storing said proper identification number corresponding to said third gene information.

17. The portable electronic device according to claim 1, wherein, given said gene information as a first gene information and another gene information provided by another portable electronic device connected to said host machine as a second gene information, said character information generation section exchanges said first and second gene information in accordance with an exchange instruction.

18. An entertainment system including a host machine having a program-execution function and subordinate machines equipped with an interface for connecting said subordinate machines to said host machine, wherein said host machine transfers to said subordinate machines information obtained by execution of a program; and said subordinate machines have an identification-number holding section for holding proper identification numbers;

a memory for loading a conversion table containing gene information corresponding to said proper identification numbers, said conversion table received via said host machine; and a character-information generation section for generating proper character information in accordance with said gene information and for transferring said proper character information to said host machine.

19. The entertainment system according to claim 18, wherein said host machine transfers to said subordinate machines a conversion table designated by the identification number transferred from said subordinated machines.

20. An image generation method comprising the steps of:

receiving a conversion table which includes gene information corresponding to proper identification numbers;

generating proper character information in response to at least said gene information; and generating a character image based on said character information.

21. The image generation method according to claim 20, further comprising the step of:

generating operation information in response to an input operation performed at an input operation section, wherein said proper character information is generated in accordance with at least said gene information and said operation information.

22. The image generating method according to claim 20, further comprising the step of:

continuously generating time information, wherein said proper character information is generated in accordance with at least said gene information and said time information.

23. The image generating method according to claim 20, wherein said gene information comprises a one-dimensional array that includes information regarding multiple portions of at least a face of an individual designated by said character image based on said character information.

24. The image generating method according to claim 20, wherein said gene information comprises a one-dimensional array filled with maximum values of latent abilities of an individual designated by said character image based on said character information.

25. The image generating method according to claim 20, further comprising the steps of:

given said gene information as a first gene information and another gene information different from said first gene information as a second gene information, generating third gene information based on at least said first and second gene information;

generating another character information based on said third gene information; and generating a character image based on said another character information.

26. The image generating method according to claim 25, wherein k-th column of said third gene information is generated from k-th columns of said first and second gene information through a predetermined rule, for k=1,2, . . . , n.

27. The image generating method according to claim 26, wherein said step of generating said third gene information comprises a mutation process.

28. The image generating method according to claim 27, wherein said mutation process comprises determining variation amount for certain columns in said third gene information by random numbers.

29. The image generating method according to claim 26, wherein said predetermined rule is a selection rule for selecting either one of the k-th columns of said first and second gene information as the k-th column of said third gene information.

30. The image generating method according to claim 26, wherein said predetermined rule is a rule for calculating the average of the k-th columns of said first and second gene information as the k-th column of said third gene information.

31. The image generating method according to claim 26, wherein said rule is a rule for using linear interpolation of the k-th columns of said first and second gene information in determining the k-th column of said third gene information.

32. A recording medium storing at least a conversion table which includes gene information corresponding to proper identification numbers and a character image generation program, wherein said character image generation program comprises procedures for:

reading said conversion table;

generating proper character information in accordance with at least said gene information; and generating a character image based on said character information.

* * * * *